（12）United States Patent
Agarwal (10) Patent No.: US 11,379,117 B2
(45) Date of Patent: Jul. 5, 2022

(54) STORAGE SYSTEM AND METHOD FOR USING HOST-ASSISTED VARIABLE ZONE SPEED GRADE MODES TO MINIMIZE OVERPROVISIONING (71) Applicant: Western Digital Technologies, Inc., San Jose, CA (US)

(72) Inventor: Dinesh Kumar Agarwal, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/906,644

(22) Filed: Jun. 19, 2020

(65) Prior Publication Data
US 2021/0397348 A1 Dec. 23, 2021

(51) Int. Cl.
*G06F 3/06* (2006.01)
(52) U.S. Cl.
CPC .......... *G06F 3/0604* (2013.01); *G06F 3/0631* (2013.01); *G06F 3/0658* (2013.01); *G06F 3/0659* (2013.01); *G06F 3/0679* (2013.01)
(58) Field of Classification Search
CPC .... G06F 3/0604; G06F 3/0631; G06F 3/0658; G06F 3/0659; G06F 3/0679; G06F 3/061; G06F 3/0611; G06F 3/0613
See application file for complete search history.

(56) References Cited

U.S. PATENT DOCUMENTS

| | | | |
|---|---|---|---|
| 6,724,682 B2 | 4/2004 | Lee et al. | |
| 7,631,138 B2 | 12/2009 | Gonzalez et al. | |
| 8,856,425 B2 | 7/2014 | Shen | |
| 8,918,577 B1 | 12/2014 | Gorobets et al. | |
| 9,092,340 B2 | 7/2015 | Sprouse et al. | |
| 2007/0011421 A1* | 1/2007 | Keller | G06F 1/3225 711/165 |
| 2009/0113154 A1* | 4/2009 | Guan | G06F 3/0607 711/163 |
| 2012/0272237 A1* | 10/2012 | Baron | G06F 9/5077 718/1 |

(Continued)

OTHER PUBLICATIONS

Tapasya Patki, David K. Lowenthal, Barry Rountree, Martin Schulz, and Bronis R. de Supinski. 2013. Exploring hardware overprovisioning in power-constrained, high performance computing. In Proceedings of the 27th international ACM conference on International conference on supercomputing (ICS '13). Association for C.*

(Continued)

*Primary Examiner* — Andrew J Cheong
(74) *Attorney, Agent, or Firm* — Crowell & Moring LLP (57) ABSTRACT

A storage system and method for using host-assisted variable zone speed grade modes to minimize overprovisioning are provided. In one embodiment, a controller of the storage system is configured to receive a request from a host for creation of a zone of memory; in response to the request, create the zone to avoid overprovisioning the zone; determine speed grades of a plurality of usage modes of the zone; inform the host of the speed grades of the plurality of usage modes of the zone; and receive, from the host, a command to write data in the zone pursuant to one of the plurality of usage modes. Other embodiments are provided.

18 Claims, 12 Drawing Sheets

(56) References Cited

U.S. PATENT DOCUMENTS

| | | | | |
|---|---|---|---|---|
| 2012/0303873 A1* | 11/2012 | Nguyen | ................ | G06F 3/0616 |
| | | | | 711/103 |
| 2014/0115238 A1* | 4/2014 | Xi | ........................... | G06F 12/12 |
| | | | | 711/159 |
| 2015/0347310 A1* | 12/2015 | Ish | ...................... | G06F 12/0871 |
| | | | | 711/3 |
| 2016/0179379 A1* | 6/2016 | Hoffman | ................. | G06F 12/08 |
| | | | | 711/103 |
| 2016/0299724 A1* | 10/2016 | Vanaraj | ............... | G06F 11/1076 |
| 2018/0366171 A1* | 12/2018 | Li | ........................ | G11C 11/161 |
| 2020/0167073 A1* | 5/2020 | Chen | ..................... | G06F 12/023 |
| 2021/0133049 A1* | 5/2021 | Danilov | ............. | G06F 11/1469 |
| 2021/0389879 A1* | 12/2021 | Inbar | ................... | G11C 11/5628 |

OTHER PUBLICATIONS

C. Chang et al., "Exploiting Write Heterogeneity of Morphable MLC/SLC SSDs in Datacenters with Service-Level Objectives," in IEEE Transactions on Computers, vol. 66, No. 8, pp. 1457-1463, Aug. 1, 2017, doi: 10.1109/TC.2017.2677425.*

* cited by examiner

STORAGE SYSTEM AND METHOD FOR USING HOST-ASSISTED VARIABLE ZONE SPEED GRADE MODES TO MINIMIZE OVERPROVISIONING

BACKGROUND

A memory of a storage system can be configured into a plurality of zones. Each zone, which can be in a single memory die or span several memory dies, provides a logical block address (LBA) range that is written sequentially and is erased/reset before it can be written into again. The host can manage the creation and use of zones.

DETAILED DESCRIPTION

Overview

By way of introduction, the below embodiments relate to a storage system and method for using host-assisted variable zone speed grade modes to minimize overprovisioning. In one embodiment, a storage system is provided comprising a memory and a controller. The controller is configured to receive a request from a host for creation of a zone of memory; in response to the request, create the zone to avoid overprovisioning the zone; determine speed grades of a plurality of usage modes of the zone; inform the host of the speed grades of the plurality of usage modes of the zone; and receive, from the host, a command to write data in the zone pursuant to one of the plurality of usage modes.

In some embodiments, the memory comprises a plurality of memory dies, and wherein the controller is further configured to avoid overprovisioning the zone by creating the zone from some but not all of the memory dies.

In some embodiments, creating the zone from some but not all of the memory dies creates different speed grades of the plurality of usage modes of the zone.

In some embodiments, the speed grades of the plurality of usage modes of the zone differ due to variable asymmetric blocks across the plurality of memory dies.

In some embodiments, the controller is further configured to inform the host that the storage system supports the plurality of usage modes of the zone.

In some embodiments, the speed grades are a factor of a total bandwidth of the storage system.

In some embodiments, the controller is further configured to provide the host with an update to a zone attribute.

In some embodiments, the memory comprises a three-dimensional memory.

In another embodiment, a method is provided that is performed in a host in communication with a storage system comprising a memory. The method comprises sending a request to the storage system to form a zone of memory; receiving, from the storage system, speed grades of a plurality of usage modes of the zone; and sending a request to the storage system to write data in the zone pursuant to one of the plurality of usage modes.

In some embodiments, the memory comprises a plurality of memory dies, and wherein overprovisioning of the zone is avoided by forming the zone from some but not all of the memory dies.

In some embodiments, forming the zone from some but not all of the memory dies creates different speed grades of the plurality of usage modes of the zone.

In some embodiments, the method further comprises receiving a notification from the host that the storage system supports the plurality of usage modes of the zone.

In some embodiments, the speed grades are a factor of a total bandwidth of the storage system.

In some embodiments, the method further comprises receiving an update from the storage system on a zone attribute.

In another embodiment, a storage system is provided comprising a memory; means for receiving a request from a host for creation of a zone of memory; means for creating the zone to avoid overprovisioning the zone; means for determining speed grades of a plurality of usage modes of the zone; means for informing the host of the speed grades of the plurality of usage modes of the zone; and means for receiving, from the host, a command to write data in the zone pursuance to one of the plurality of usage modes.

In some embodiments, the memory comprises a plurality of memory dies, and wherein overprovisioning the zone is done by creating the zone from some but not all of the memory dies.

In some embodiments, the storage system further comprises means for informing the host that the storage system supports the plurality of usage modes of the zone.

In some embodiments, the storage system further comprises means for providing the host with an update to a zone attribute.

In some embodiments, the memory comprises a three-dimensional memory.

In some embodiments, the storage system is configured to be embedded in the host.

Other embodiments are possible, and each of the embodiments can be used alone or together in combination. Accordingly, various embodiments will now be described with reference to the attached drawings.

Embodiments

Figures 1A, 1B:
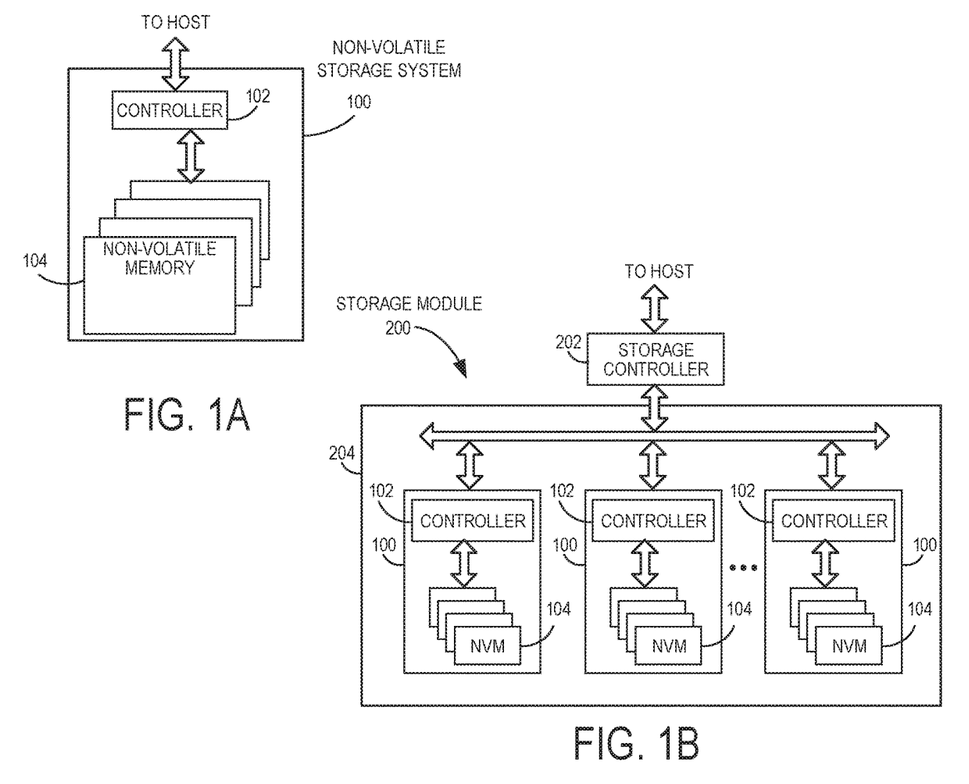
FIG. 1A is a block diagram of a non-volatile storage system of an embodiment.
FIG. 1B is a block diagram illustrating a storage module of an embodiment.
Figure 1C:
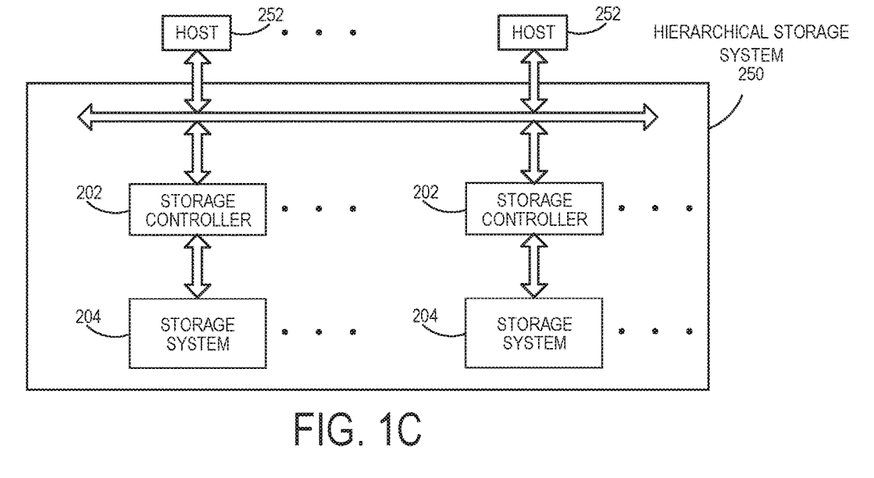
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAIVI), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
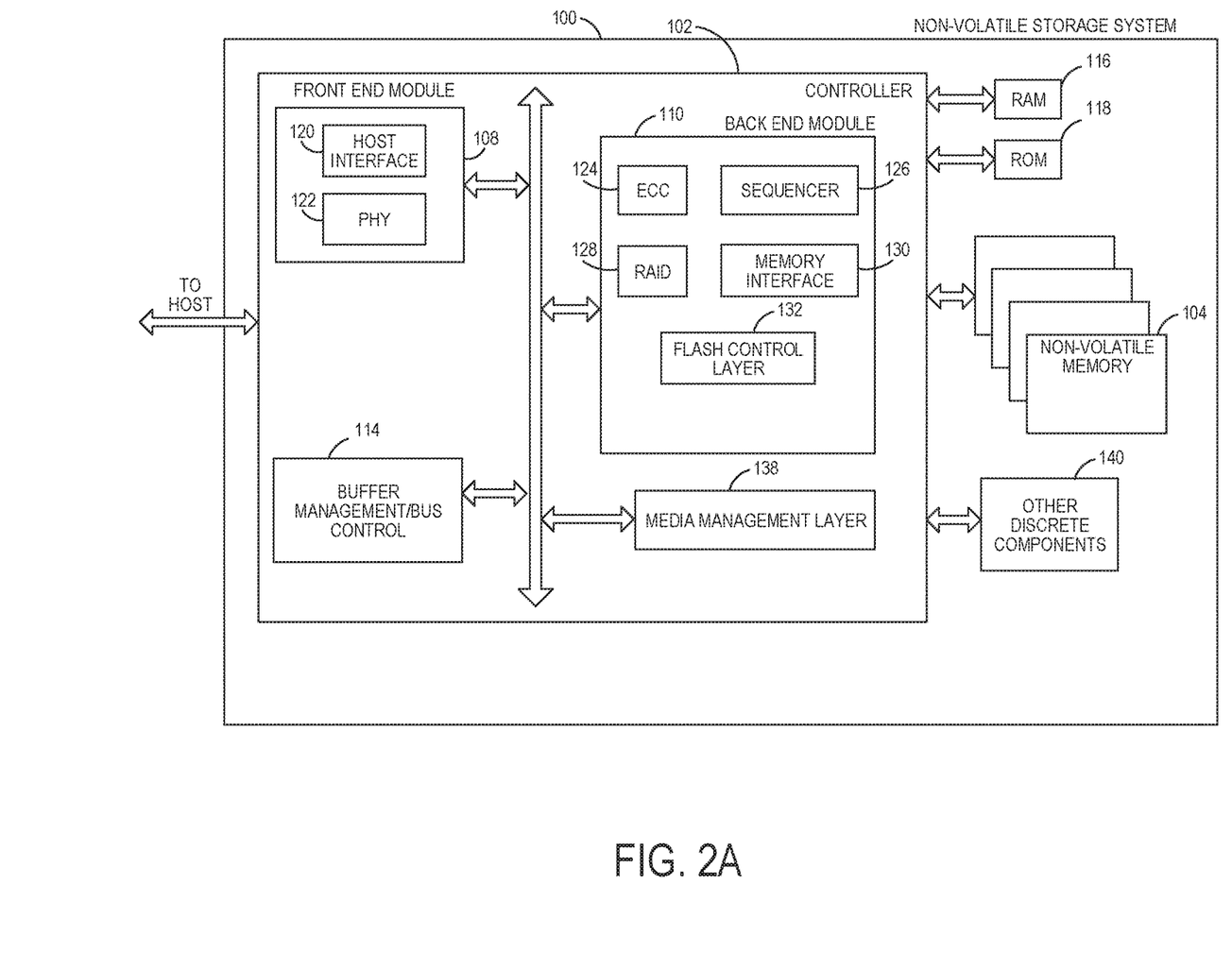
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a retention-based zone determinator 111, which will be discussed in more detail below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
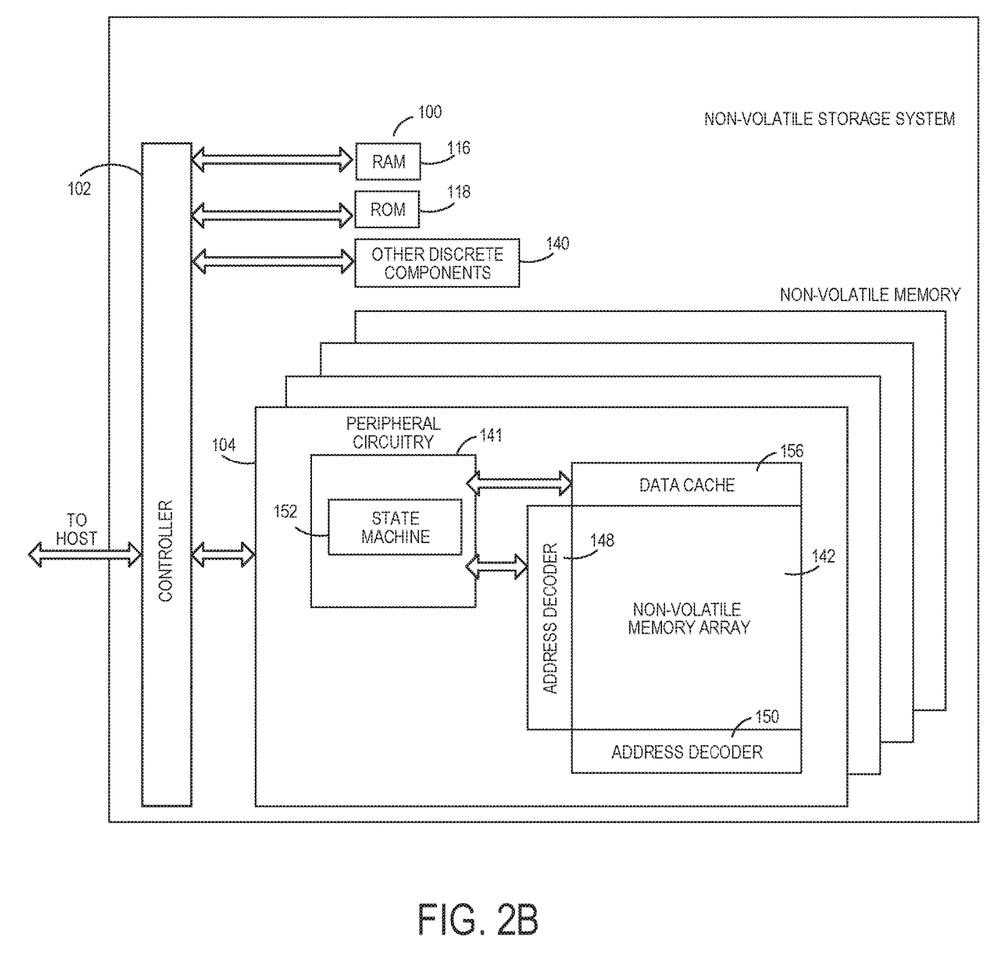
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As mentioned above, the memory 104 of the storage system 100 can be configured into a plurality of zones. Each zone, which can be in a single memory die or span several memory dies, provides a logical block address (LBA) range that is written sequentially and is erased/reset before it can be written into again. The host can manage the creation and use of zones.

With increasing block sizes that are provided with new memory generations, the overprovisioning requirements with traditional jumbo/super blocks keeps increasing. The following table shows a single physical plane block size with various memory generations:

|  | BiCS5 | | BiCS6 | |
| --- | --- | --- | --- | --- |
|  | 512G X3 2P | 512G X4 2P | 512G X3 2P | 512G X4 2P |
| Block Size | 21 MB | 28 MB | 37.5 MB | 50 MB |

Figure 3:
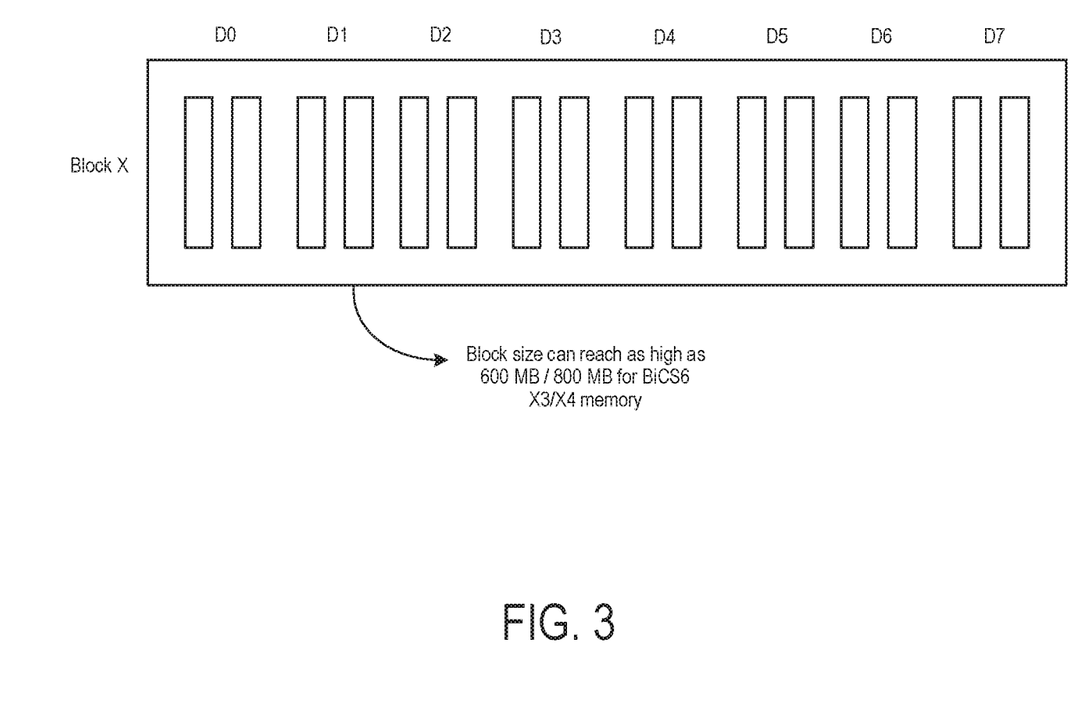
FIG. 3 is a diagram showing zone creation of an embodiment.
Figure 4A:
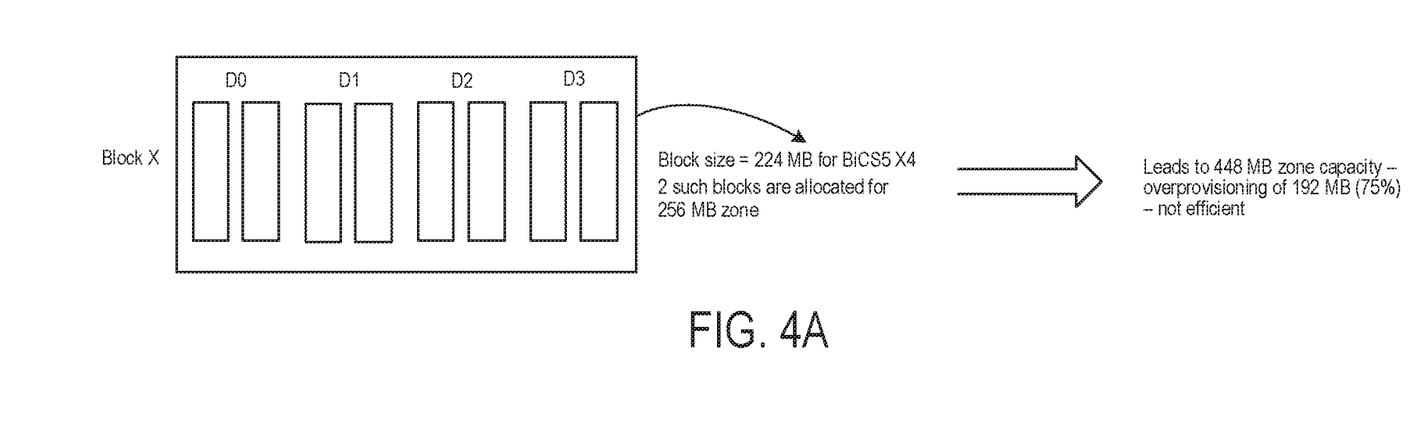
FIGS. 4A and 4B are diagrams of an embodiment illustrating overprovisioning with zones using traditional blocks.
Figure 4B:
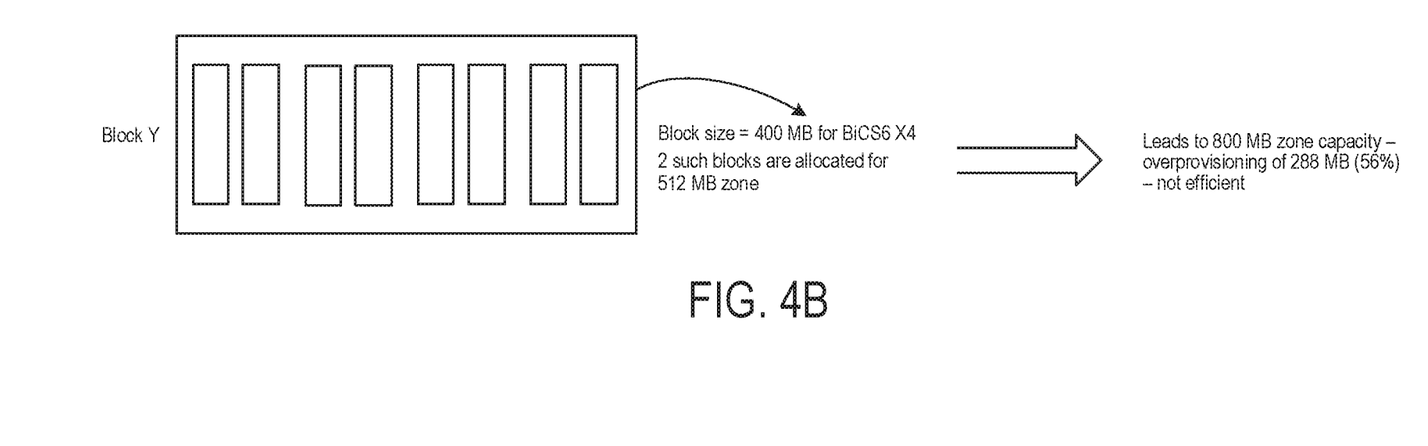

As shown in the diagram in FIG. 3, for BiCS6 memory, the X3/X4 jumbo/super block (which spans across all channels/dies) sizes can reach 600/800 MB (these and the other sizes mentioned herein are approximate sizes). For many host applications, each zone has a standard size (e.g., 2^ power). FIGS. 4A and 4B show how standard sizes can create an overprovisioning issue. In the example in FIG. 4A, the block size is 224 MB, and two such blocks are allocated for a 256 MB zone. This leads to a zone with a capacity of 448 MB. As this results in an overprovisioning of 192 MB (75% overprovisioning), this scheme is not very efficient. Similarly, in the example in FIG. 4B, the block size is 400 MB, and two such blocks are allocated for a 512 MB zone. This leads to a zone with a capacity of 800 MB. As this results in an overprovisioning of 288 MB (56% overprovisioning), this scheme is also not very efficient. As another scenario, when the blocks formed are irregular (meaning all the dies are not available in the blocks), zone speed may vary based on the number of dies and the dies that are available in the block. So, some blocks may have all the dies and some blocks may have fewer dies, or the same die may get repeated, creating the same situation (this is generally done to improve the memory yield).

Another problem with zones occurs when a zone cannot maintain a consistent performance because of variable asymmetric underlying blocks across multiple dies/channels. In this situation, it becomes difficult for the host to utilize the storage system (sometimes referred to herein as the device) 100 to full efficiency. This problem is illustrated in the graph in FIG. 5.

Figure 5:
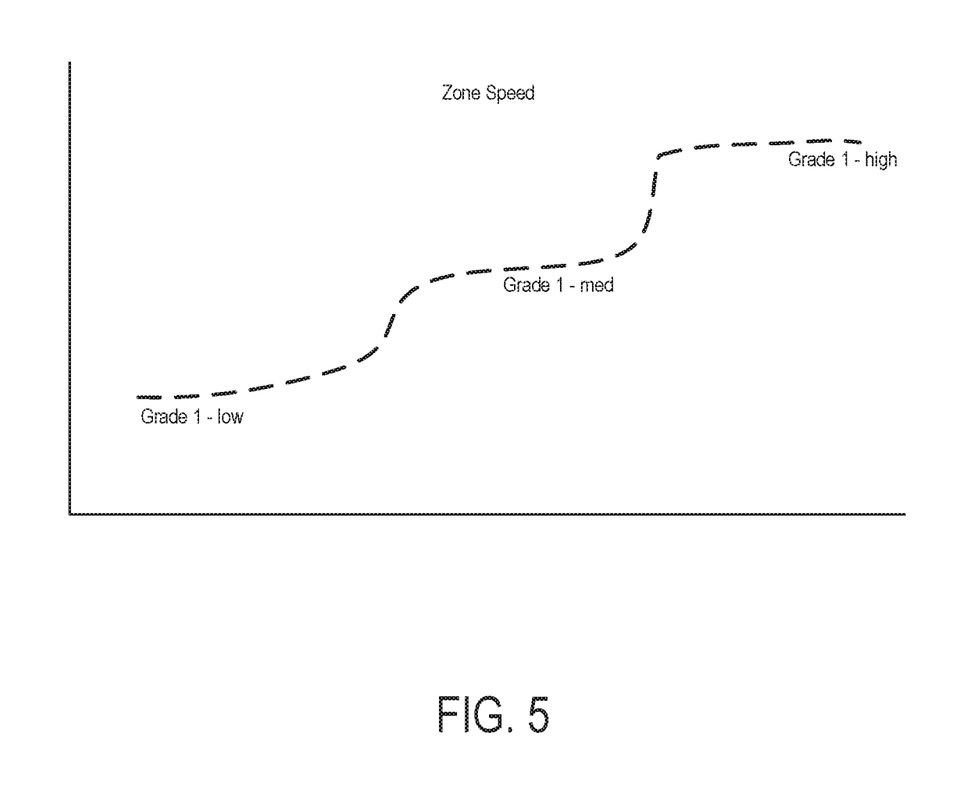
FIG. 5 is a graph of an embodiment illustrating a varying zone speed problem.
Figure 6:
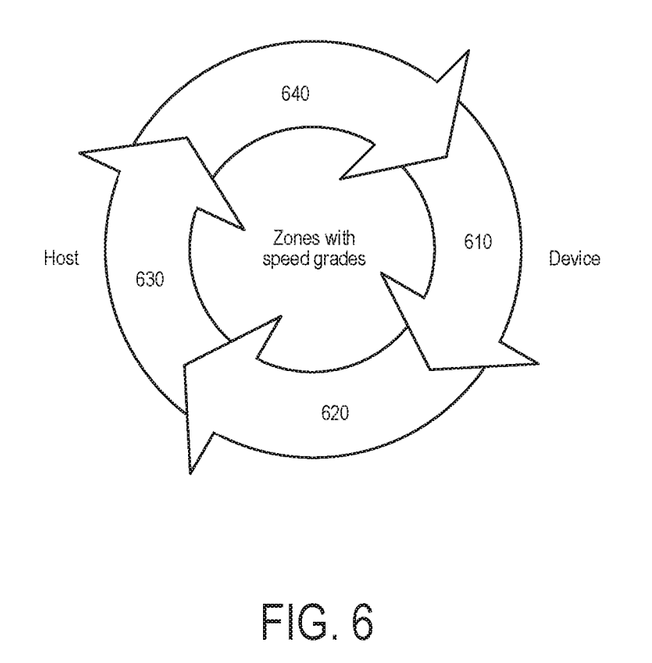
FIG. 6 is a diagram of an embodiment showing zones with speed grades.

The following embodiments can be used to utilize full device bandwidth efficiently with varying zone speeds. These embodiments can provide improvements over prior techniques that always overprovision high and maintain a consistent speed, choose a zone size close to the block size, and have zones with consistent performance all the time. FIG. 5 is a flow diagram that illustrates a method of an embodiment. As shown in FIG. 5, the storage system 100 first identifies itself as supporting multiple modes for zone varying speeds based on the parallelism used in underlying physical blocks across all channels/dies (varying number of blocks across all dies in the zone) (act 610). For example, the controller 102 in the storage system 100 can identify the storage system 100 as supporting modes for zone formation and, for each mode, define a speed grade (e.g., low/high speed grade as a factor of device full bandwidth). The speed grade can be a factor of the total device bandwidth. Next, the host chooses the zone mode and creates the zone (e.g., the host configures the device 100 to select a zone mode and varying speed grade for zone formation) (act 620). The storage system 100 updates the zone attributes in which the current mode/speed grade zone is operating (e.g., low/medium/high as a factor of device bandwidth) (act 630). Next, the host, using the zone mode, distributes loads across other zones to fully utilize the device bandwidth (i.e., the host utilizes speed grades for zone-efficient balancing and utilization) (act 640).

Figure 7:
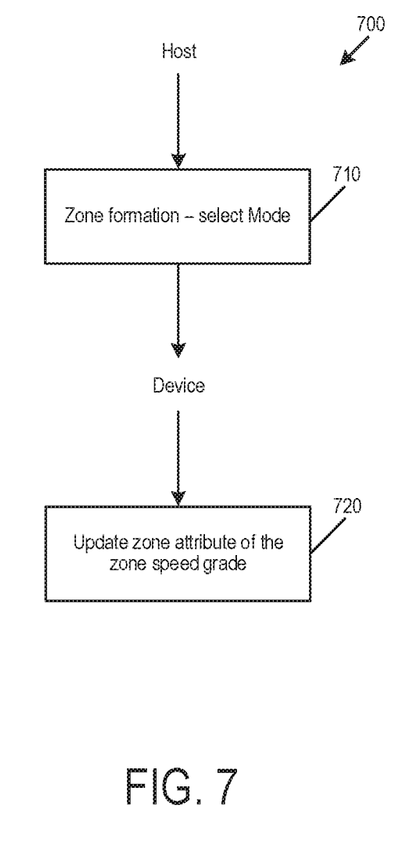
FIG. 7 is a flow chart of a method of an embodiment for forming a zone and updating zone attributes.

The flow chart 700 in FIG. 7 summarizes this process. As shown in FIG. 7, the host performs zone formation by selecting a mode (act 710). The storage system 100 then updates the zone attribute of the zone speed grade (act 720).

Figure 8:
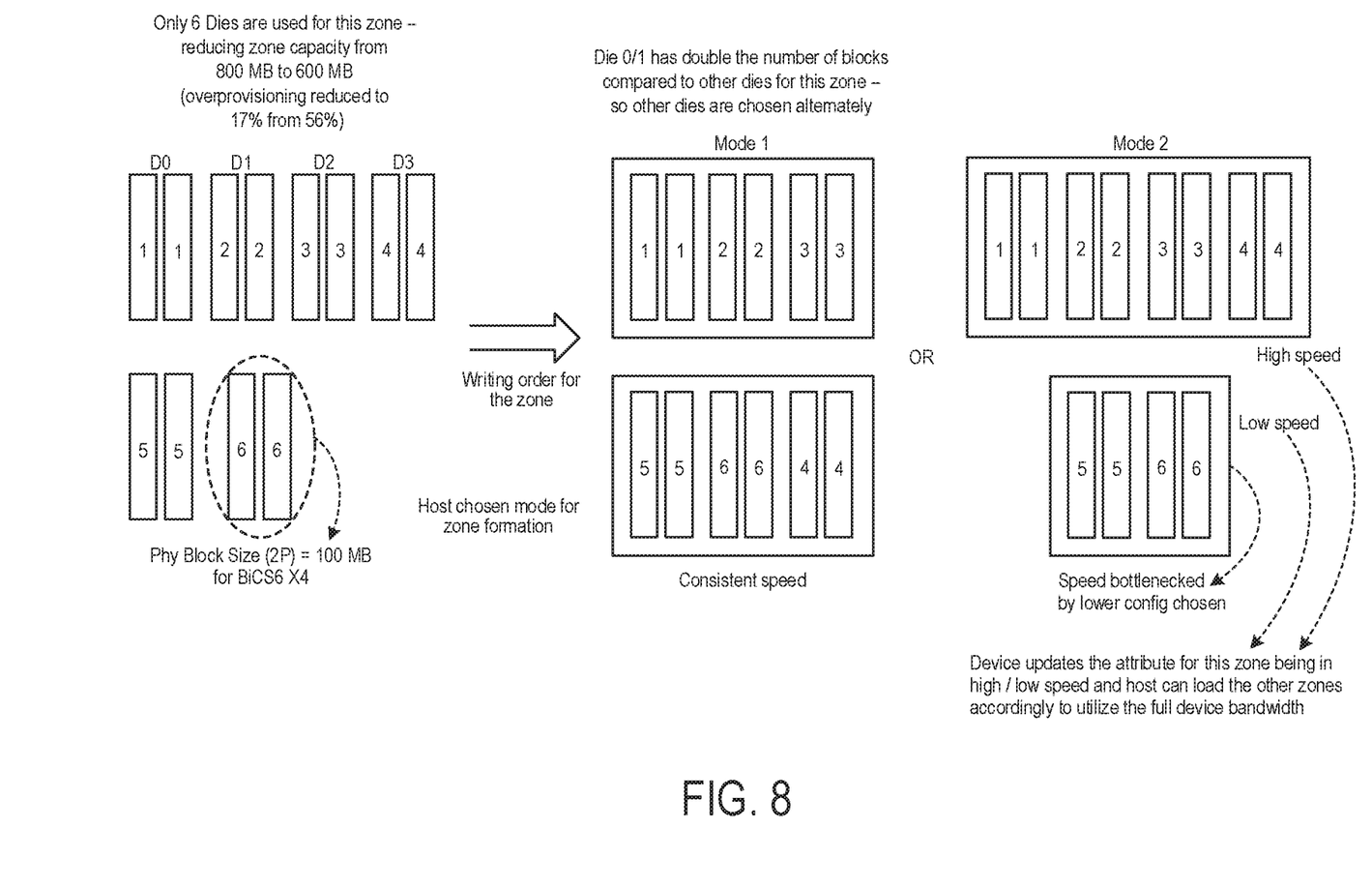
FIG. 8 is an illustration of zone modes and speed grades of an embodiment.

FIG. 8 shows that, to reduce overprovisioning, the zone may or may not use all the blocks from various dies and that multiple zone modes are possible with a given configuration. This can lead to multiple speed grades in a given zone based on the mode selected. The device 100 maintains the zone mode and speed grade (i.e., factor of full device bandwidth available), and the host utilizes it.

Figure 9:
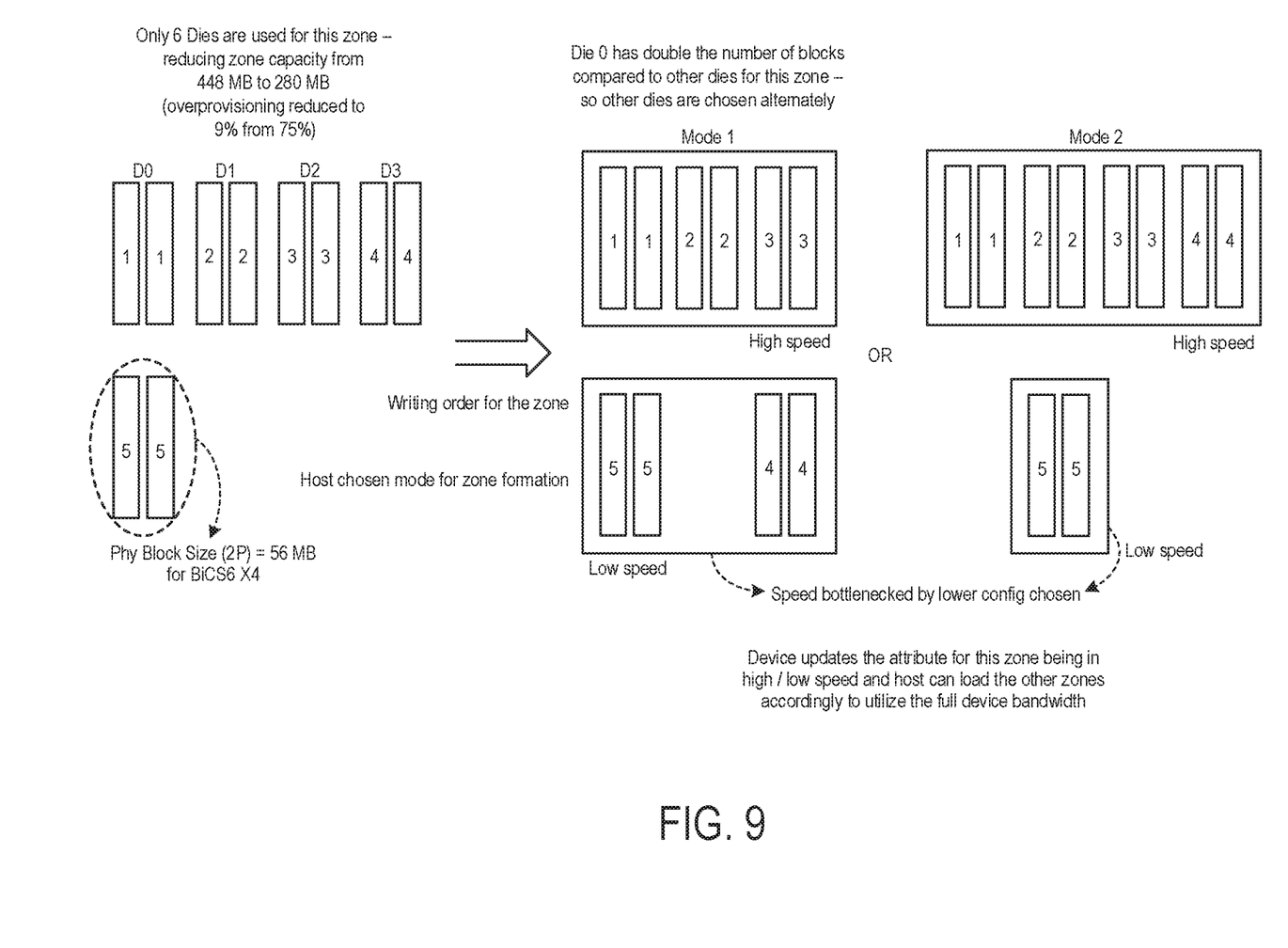
FIG. 9 is an illustration of zone modes and speed grades of an embodiment.

FIG. 9 provides an example of a different configuration. In this example, to reduce overprovisioning and handle the unbalanced number of blocks across various dies, the zone speed can vary based on the mode selection, and the host can choose the modes based on the requirements.

Figure 10:
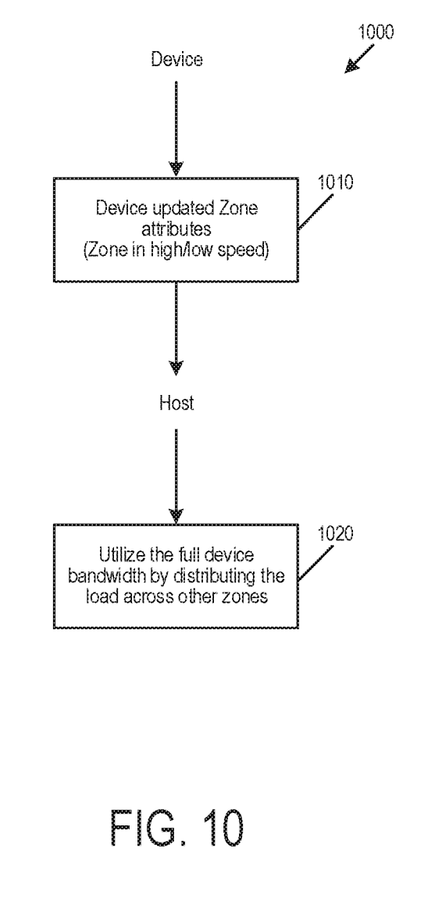
FIG. 10 is a flow chart of a method of an embodiment for updating zone attributes and utilizing full device bandwidth.

Once the zone speed grades are updated, the host can utilize them to distribute the data write load across other zones to fully utilize the device bandwidth. This is illustrated in the flow chart 1000 in FIG. 10. As shown in FIG. 10, the storage system 100 updates the zone attributes (e.g., high/low speed) (act 1010), and the host utilizes the full device bandwidth by distributing the load across other zones (act 1020).

Figure 11:
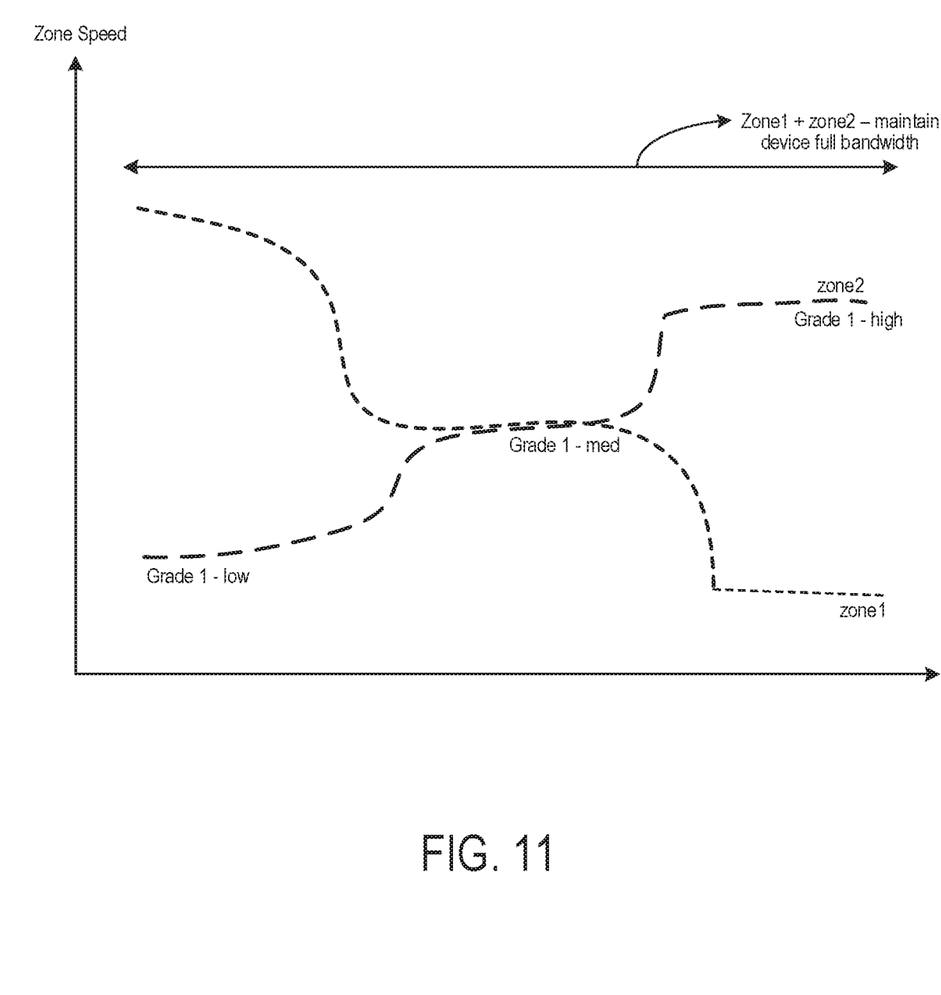
FIG. 11 is a graph of an embodiment illustrating how varying zone speeds can result in improved bandwidth.

By knowing the speed grades dynamically, the host can manage the device 100 better and can efficiently load the zone to utilize the full device bandwidth. Such utilization is shown in the graph in FIG. 11.

In summary, by having multiple speed grades for a zone, the zone formation can be done by having variable blocks from all the dies. This is communicated to host, and the device's full bandwidth is utilized. This helps in maintaining the device's full performance and keeps the overprovisioning low.

There are several advantages associated with these embodiments. For example, overprovisioning is reduced by checking the zone formation and having the variable blocks from the dies available. For example, one die can have 20 blocks, and another die can have 10 blocks. Having overprovisioning be low leads to better yield at the memory side. Further, with the embodiments, the storage system 100 can maintain and advertise multiple zone modes and speed grades. Also, by knowing the zone speed grade in advance, the host can utilize this information to load the other zones and provide full device bandwidth utilization. Additionally, since zone size is not limited to a specific number, various zone sizes can be supported, keeping the overprovisioning low/

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory comprising a plurality of memory dies, wherein a block formed from one or more memory dies of the plurality of memory dies has a size that is other than a power of two; and
   a controller configured to:
      receive a request from a host for creation of a zone of memory having a specified zone speed, wherein creation of the zone requires a plurality of blocks and results in overprovisioning because the zone has a size that is a power of two and is larger than the size of a single block; and
      in response to the request, create the zone from a subset of the plurality of memory dies reducing an amount of overprovisioning that would occur if the zone were created from all of the plurality of memory dies, wherein the subset is chosen from a plurality of subsets of memory dies based on the zone speed specified in the request, each subset of the plurality of subsets having a different zone speed.

2. The storage system of claim 1, wherein the controller is further configured to inform the host that storage system supports a plurality of usage modes.

3. The storage system of claim 1, wherein the controller is further configured to provide the host with an update to a zone attribute.

4. The storage system of claim 1, wherein the memory comprises a three-dimensional memory.

5. The storage system of claim 4, wherein the storage system is configured to be integrated in the host.

6. The storage system of claim 1, wherein the storage system is configured to removably connected with the host.

7. The storage system of claim 1, wherein the zone speed is relative to full device bandwidth.

8. The storage system of claim 1, wherein the controller is further configured to receive a command from the host to write data across the zone and a second zone.

9. The storage system of claim 1, wherein the plurality of memory dies comprises eight memory dies.

10. A method comprising:
    performing the following in a host in communication with a storage system comprising a memory comprising a plurality of memory dies, wherein a block formed from one or more memory dies of the plurality of memory dies has a size that is other than a power of two:
  sending a request to the storage system to form a zone of memory, wherein creation of the zone requires a plurality of blocks and results in overprovisioning because the zone has a size that is a power of two and is larger than the size of a single block; and
  receiving, from the storage system, an indication of a zone speed of the zone, wherein the zone is created from a subset of the plurality of memory dies reducinq an amount of overprovisioning that would occur if the zone were created from all of the plurality of memory dies and the zone speed results from one subset of a plurality of subsets of the plurality of memory dies being chosen to create the zone, each subset of the plurality of subsets having a different zone speed.

11. The method of claim 10, further comprising receiving a notification from storage system that the storage system supports a plurality of usage modes.

12. The method of claim 10, further comprising receiving an update from the storage system on a zone attribute.

13. The method of claim 10, wherein the storage system is configured to be integrated in the host.

14. The method of claim 10, wherein the storage system is configured to removably connected with the host.

15. The method of claim 10, wherein the zone speed is relative to full device bandwidth.

16. The of claim 10, wherein the controller is further configured to receive a command from the host to write data across the zone and a second zone.

17. The method of claim 10, wherein the plurality of memory dies comprises eight memory dies.

18. A storage system comprising:
  a memory comprising a plurality of memory dies, wherein a block formed from one or more memory dies of the plurality of memory dies has a size that is other than a power of two;
  means for receiving a request from a host for creation of a zone of memory having a specified zone speed, wherein creation of the zone requires a plurality of blocks and results in overprovisioning because the zone has a size that is a power of two and is larger than the size of a single block; and
  means for creating the zone from a subset of the plurality of memory dies reducing an amount of overprovisioning that would occur if the zone were created from all of the plurality of memory dies, wherein the subset is chosen from a plurality of subsets of memory dies based on the zone speed specified in the request, each subset of the plurality of subsets having a different zone speed.

* * * * *